May 6, 1930.  G. W. GAIL ET AL  1,757,041
EVAPORATOR ELEMENT
Filed Jan. 13, 1927  4 Sheets-Sheet 1

May 6, 1930.　　　　G. W. GAIL ET AL　　　　1,757,041
EVAPORATOR ELEMENT
Filed Jan. 13, 1927　　　4 Sheets-Sheet 2
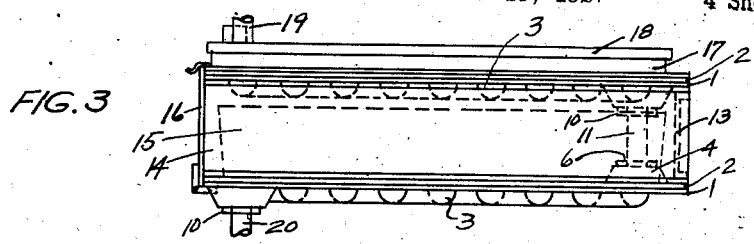
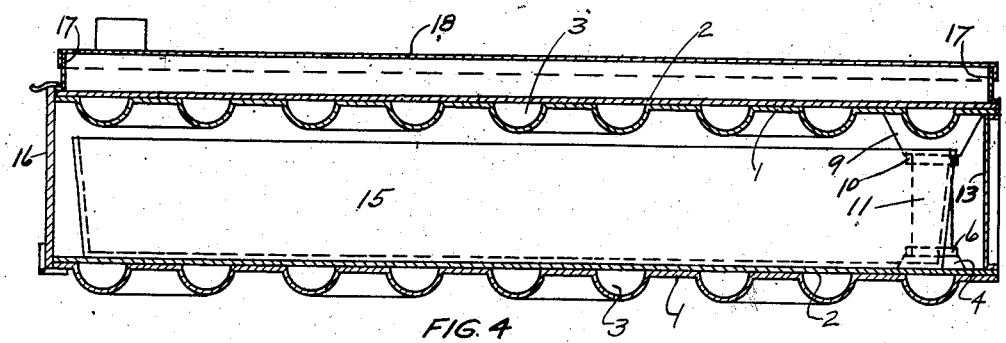
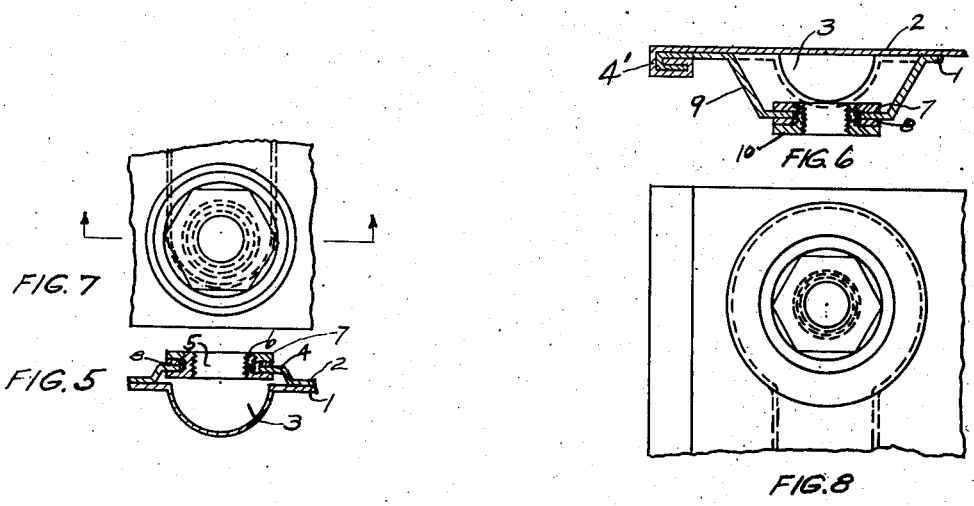

May 6, 1930.  G. W. GAIL ET AL  1,757,041
EVAPORATOR ELEMENT
Filed Jan. 13, 1927   4 Sheets-Sheet 3
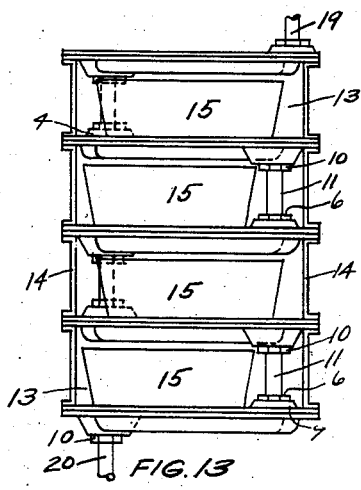
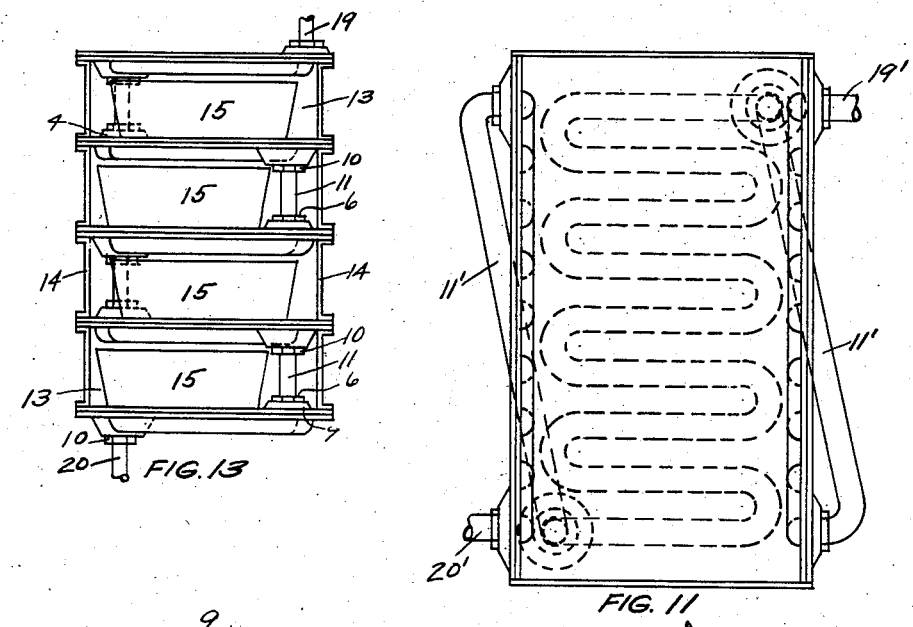
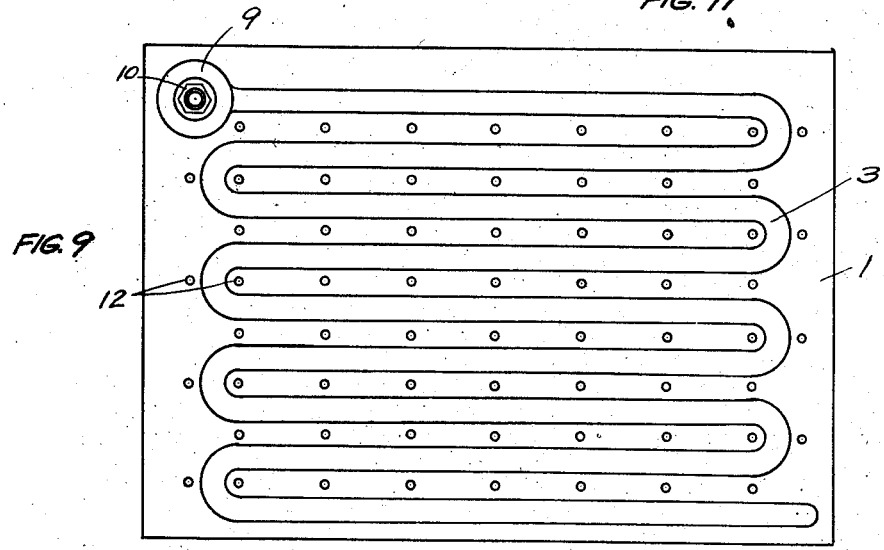

May 6, 1930.　　G. W. GAIL ET AL　　1,757,041
EVAPORATOR ELEMENT
Filed Jan. 13, 1927　　4 Sheets-Sheet 4

INVENTORS
Abraham J. Kusel
George W. Gail
BY
ATTORNEY.

Patented May 6, 1930

1,757,041

UNITED STATES PATENT OFFICE

GEORGE W. GAIL, OF RUXTON, MARYLAND, AND ABRAHAM J. KUSEL, OF BRIDGEPORT, CONNECTICUT, ASSIGNORS TO KULAIR CORPORATION, OF BALTIMORE, MARYLAND, A CORPORATION OF DELAWARE

EVAPORATOR ELEMENT

Application filed January 13, 1927. Serial No. 160,960.

This invention relates to an improved evaporator element and in its broadest aspects comprises a series arrangement of heat exchange units each consisting of a semiflat coil constructed of two plates superimposed one upon the other and joined together to form an absolute fluid tight union at their contacting surfaces. One of the plates is pressed or stamped by suitable dies or the like, to produce a continuous serpentine depression or groove, preferably semi-circular in cross-section, so that by attaching a flat plate to the flat face of the stamped plate, a closed flat coil is produced.

Such a construction as above outlined, can be quickly and cheaply produced of very light material and yet possess great strength and rigidity and capable of performing with maximum efficiency every function of a heat exchange unit of the full coil type.

This unit is applicable to many uses, but in the present instance will be described in connection with an expander or evaporator element or "low side" coil for a refrigerating machine of the domestic or household type, and the preferred and various means of assembling several of these units in a novel and efficient manner, will be hereinafter described in detail.

The object in view, in adapting this particular construction to the design of expander element herein shown and described, is to produce a quick ice maker and at the same time provide proper refrigeration of the cooling chamber, in a most simple and economical manner. This is a very important factor in the quantity production of domestic refrigerating plants and eliminates costly tube coils and other complicated and expensive units, requiring experts in the construction and assembly of these elements.

Another important feature resides in the fact that by using a coil unit of the type indicated, having a flat upper surface, in the assembled evaporator constructions as shown, there will be a complete and uninterrupted contact between said expander unit and the flat bottom of the ice pans supported thereby, thus obtaining the maximum efficiency of said expander unit and at the same time retaining all of the advantages of a full coil unit and the desirable effects incident to the circuitous travel of the refrigerant through such a coil.

Another object is the production of a unit of this type, whereby any number of said units may be conveniently assembled to increase or decrease the heat absorbing surface of the element, according to the size and capacity of the refrigerating plant desired. Also said units can be arranged in various ways in accordance with the particular use in contemplation.

The preferred embodiment of the invention is illustrated in the accompanying drawing in which Fig. 1 is a top plan view illustrating the contemplated arrangement of two units to form an expander element as intended for a domestic refrigerator;

Fig. 3 is an end elevation;

Fig. 4 is an enlarged transverse cross-sectional view on line A—A Fig. 1, of the two assembled units comprising the expander element;

Figs. 5 and 6 are enlarged detailed views showing the preferred manner of providing for the pipe connections between the top plate of the lower unit and the bottom plate of the upper unit respectively, and also the inlet and outlet connections to and from the expander element;

Figs. 7 and 8 are top and bottom plan views of Figs. 5 and 6 respectively;

Fig. 9 is a top plan view of the grooved or corrugated plate or unit, with the flat top plate removed; and Fig. 10 is a side elevation thereof;

Figs. 11 and 12 illustrate in elevation and plan views, another means of assembling the units to constitute a box-like chamber or receptacle, with the necessary pipe connections from one unit to the other to provide a continuous passage for the refrigerant therethrough;

Fig. 13 shows a manner of assembling a number of the units in horizontal position, clearly illustrating how the expander element can be enlarged or decreased according to the size of element desired. It also shows how a number of small or short units can be arranged one above the other where it is not possible or desirable to use a relatively long flat element as disclosed in Figs. 1 and 2;

Figure 1:
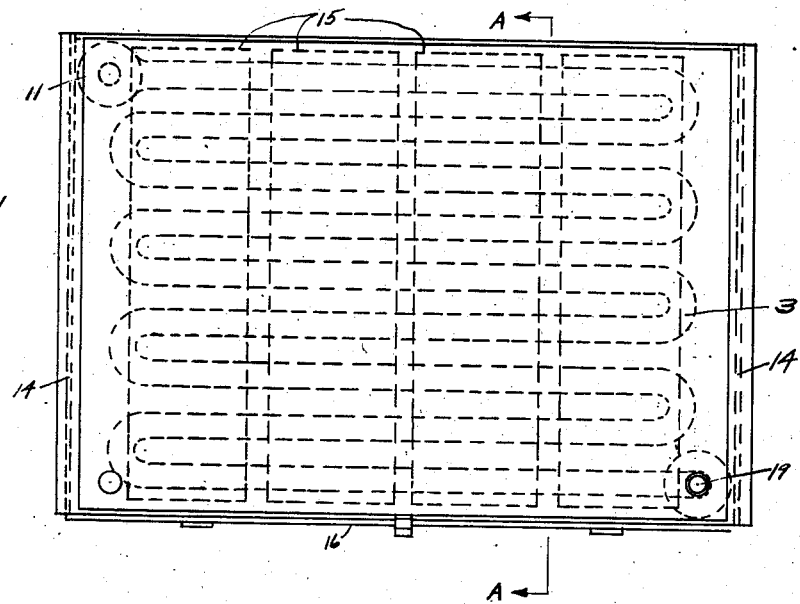
Figure 2:
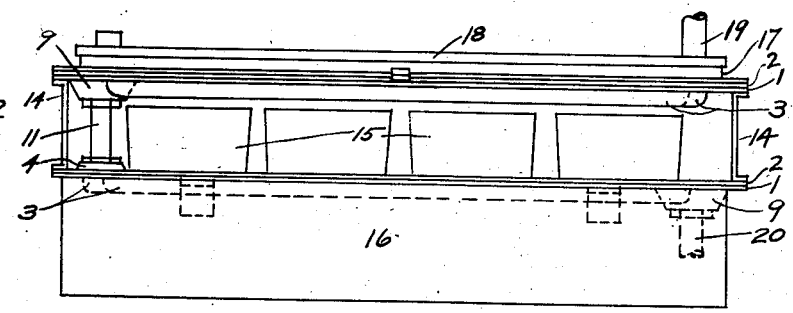
Fig. 2 is a front elevation showing the manner of assembling and connecting the two units together, providing a space or compartment therebetween for the reception of the ice pans.

Referring to the drawings in detail, the improved unit, which forms a basis of the various arrangements herein described, comprises a lower sheet 1 and an upper sheet 2 superimposed one upon the other as more clearly shown in Fig. 4. The lower sheet 1 is corrugated in such a manner as to produce a continuous serpentine groove 3. This groove is formed, preferably, from a flat sheet by stamping or the like with suitable dies in any well known manner, producing a substantially corrugated sheet of the cross-section as shown in Fig. 4. Superimposed upon this corrugated or grooved sheet 1 is the upper flat sheet 2, one of the meeting faces of said sheets being coated previously thereto, with a thin layer of solder or the like. Heat and pressure is then applied to these assembled sheets, resulting in the melting of the solder and a perfect fluid tight union of said sheets into a complete unit. To further strengthen the structure the outer edges of the connected sheets 1 and 2 may be crimped as shown at 4' in the enlarged detailed view Fig. 6.

As hereinbefore stated this groove 3 is a continuous serpentine one, extending from one end of the sheet to the other, providing for the uninterrupted passage of fluid therethrough during the use of the unit. It is therefore necessary to provide inlet and outlet connections for the admission and discharge of the fluid passing through the groove or coil 3, and where very thin metal is used and in order to make a strong tight joint a special construction is necessary. In the present instance the preferred method is illustrated in the enlarged detailed views Figs. 5, 6, 7 and 8, Figs. 5 and 7 showing the inlet connection and Figs. 6 and 8 the outlet connection. In forming the inlet connection the flat top sheet 2 is pressed upwardly to produce a raised portion 4 and then punched to provide an opening or hole 5 for the reception of a threaded flanged nipple 6, secured in place and clamped to the raised portion 4 by a lock nut or the like 7. If desired a soft metal washer 8 may also be employed to insure a tight joint, and in addition these fittings may also be soldered in place to complete the structure and further provide a fluid tight joint.

In forming the outlet connection, see Fig. 6, one end of the groove 3 in the plate 1 is swelled out to produce an enlarged portion 9 and then punched to provide an opening or hole to receive a flange nipple 10 of the same construction and secured in place in the same manner as that described in connection with Fig. 5.

When two or more units are assembled to form an expander element, as shown in Figs. 2, 3, 4 and 13, these inlet and outlet connections 4 and 9 are joined by a pipe or tube 11 threaded into the respective nipples 6 and 10.

The construction of the grooved sheet 1 is best shown in Figs. 9 and 10 clearly illustrating the continuous serpentine groove 3 and the enlarged downwardly pressed portion 9, formed at one end of the groove, and the associated pipe connection 10 hereinbefore referred to. This sheet 1 may also be provided with holes 12 for the reception of rivets or the like forming an additional means for fastening the plates together, the flat top plate 2 likewise being provided with rivet holes registering with the holes 12.

As hereinbefore stated these units comprising the grooved plate 1 and the flat plate 2, with the necessary inlet and outlet connection, may be assembled in various ways to produce an expander element or "low side" coil for refrigerating machines.

The preferred arrangement is illustrated in Figs. 1, 2, 3 and 4, wherein two units are positioned, one above the other, and maintained in spaced relation by a back plate 13 and end plates 14, forming with the upper and lower units, a box-like compartment or chamber for the reception of the ice making pans 15, the front of said chamber being closed preferably by a hinged door or the like 16.

By reason of the fact that the top sheet of the improved unit is perfectly flat, a complete and maximum contact is obtained between said unit and the flat bottoms of the ice pans supported thereby. Also a "hold over" brine tank can be conveniently constructed on the top of the upper unit by securing a relatively narrow upstanding strip 17 around the upper edge of said unit, forming a shallow tray to be closed with a cover or the like 18.

With the construction of expander element or "low side", above outlined, the inlet connection 6 to the upper unit is connected, through the necessary expansion valve (not shown), to the conduit 19 leading from the compressor. The inlet connection 6 to the lower unit is connected through pipe 11 to the outlet connection 10 of the upper unit and the said outlet connection 10 of the lower unit is connected to the return line 20, best shown in Fig. 3, so that the refrigerant is caused to travel in a continuous serpentine stream from end to end of both units and thus sufficiently retarded to absorb the maximum amount of heat in proportion to the quantity of refrigerant passing through said units.

Where it is desired to employ more than two of these units in forming the expander element in large installations, the same can be assembled in a manner as shown in Fig. 13 and also this arrangement is applicable where a tall narrow element is necessary, in which instance the individual units are made relatively smaller.

Figure 12:
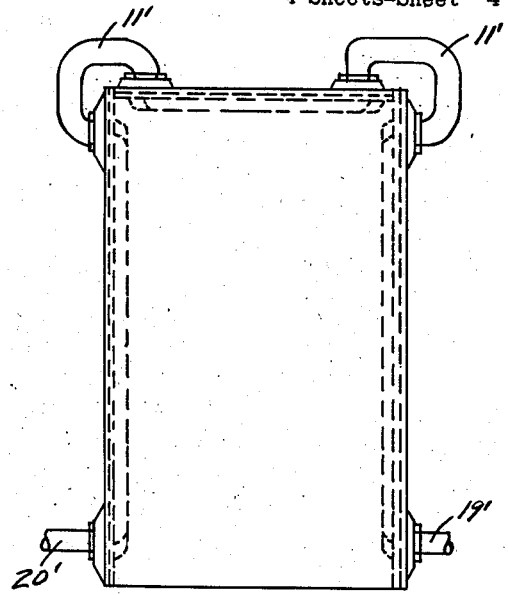

In Figs. 11 and 12 a box-like arrangement is shown in elevation and plan respectively, wherein the units are disposed vertically and secured together at their longitudinal edges, the necessary inlet and outlet pipes 19' and 20' respectively being provided, together with the unit coil connecting pipes 11', as clearly shown in said figures.

Figure 16:
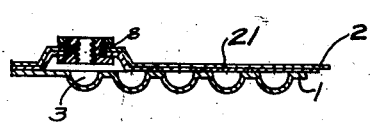
Fig. 16 is a transverse sectional view illustrating this alternative method of construction and assembly.
Figure 14:
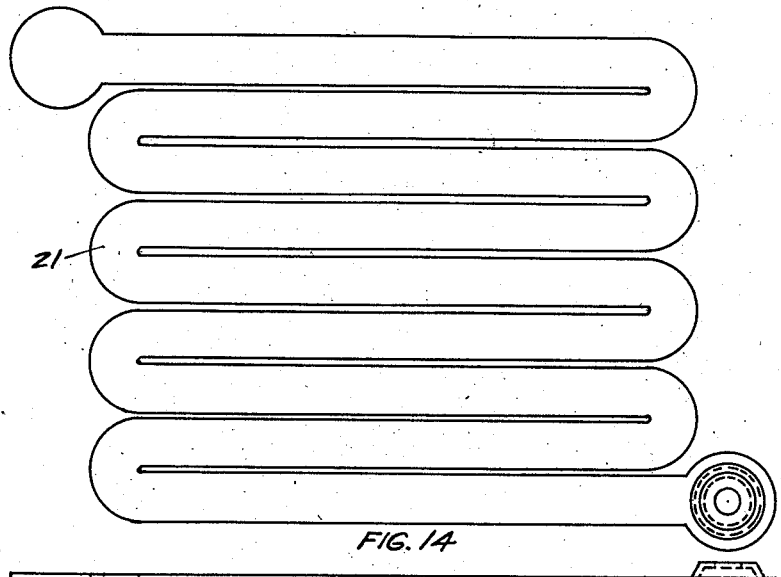
Figs. 14 and 15 represent a flat sheet cut in the form of a serpentine coil, to be inserted when desired between the lower grooved sheet and the top flat sheet of the unit, to further insure the tightness of the coil produced.
Figure 15:

In some instances, when necessary to further insure a fluid tight coil, there may be interposed between the grooved sheet 1 and the flat sheet 2, an intermediate flat coil strip 21, Figs. 14, 15 and 16, said strip being positioned over the groove 3 in the sheet 1 and then soldered along its edges, after which the top flat sheet 2 is applied in the manner hereinbefore described.

What we claim is:

1. An expander element for refrigerating machines, comprising a series of individually formed substantially flat plate-like heat exchange units superimposed one upon the other and rigidly secured one to the other in spaced relation, and conduits connecting the respective units.

2. An expander element for refrigerating machines, comprising a series of individually formed heat exchange units superimposed one upon the other and rigidly connected one to the other in spaced relation, each of said units consisting of a grooved plate and a flat plate secured together to produce a continuous fluid tight passageway between said plates and means for connecting the passageways of the respective units.

3. An expander or refrigerating element, comprising a series of individually formed substantially flat plate-like heat exchange units rigidly connected together in spaced relation, each of said units being provided with a continuous serpentine passageway and conduits connecting the passageways of the respective units.

4. An expander element for refrigerating machines, comprising a series of individually formed heat exchange units superimposed one upon the other in spaced relation, each of said units consisting of a grooved bottom plate and a flat top plate secured together to provide a continuous serpentine fluid tight passageway between said plates, means for maintaining said units in spaced relation comprising side and end plates, rigidly connected to said units, whereby an ice making chamber is provided between the respective heat exchange units.

5. An expander element for refrigerating machines, comprising upper and lower heat exchange units, each of said units consisting of a bottom plate formed with a continuous serpentine groove and a flat top plate secured together, vertically arranged back and side plates interposed between said units for maintaining the heat exchange units in spaced relation and rigidly connected thereto and providing a substantially closed in ice making compartment between said units for receiving a number of ice pans, and a closure for the front of said compartment.

6. An expander element for refrigerating machines, comprising a series of heat exchange units superimposed one upon the other in spaced relation, each of said units consisting of a grooved plate and a flat plate secured together to provide a continuous serpentine fluid tight passageway between said plates, means for rigidly maintaining said units in spaced relation, means for admitting a refrigerant to the uppermost unit, means for discharging the refrigerant gas from the lowermost unit and communicating conduits between the successive units.

7. An expander element for refrigerating machines, comprising a series of heat exchange units superimposed one upon the other in spaced relation, each of said units consisting of a grooved bottom plate and a flat top plate secured together to provide a continuous serpentine fluid tight passageway between said plates, means for rigidly maintaining said units in spaced relation comprising side and end plates, whereby an ice making chamber is provided between the respective heat exchange units and means for connecting the passageways of the respective units.

8. An expander element for refrigerating machines, comprising a series of heat exchange units rigidly connected one to another in spaced relation, each of said units consisting of a grooved plate and a flat plate secured together to provide a continuous serpentine fluid tight passageway between said plates and means for connecting the passageways of the respective units.

9. An expander or refrigerating element, comprising a series of individually formed substantially plate like heat exchange units, each of said units being provided with a continuous serpentine passageway, means for rigidly connecting said units together in spaced relation and means for connecting the passageways of the respective units.

10. An expander or refrigerating element, comprising a series of individually formed substantially flat plate like heat exchange units, each of said units being provided with a continuous serpentine passageway, means for rigidly connecting said units together in spaced relation and conduits for connecting in series the passageways of the respective units.

11. An expander or refrigerating element, comprising a series of individually formed substantially plate like heat exchange units superimposed one upon the other, each of said units being provided with a continuous serpentine passageway, means for rigidly connecting said units together in spaced relation and means for connecting in series the passageways of the respective units, said first mentioned means being separate and distinct from said last mentioned means.

In testimony whereof we affix our signatures.

ABRAHAM J. KUSEL.
GEORGE W. GAIL.